(No Model.)
W. H. PERKINS.
REPAIR TOOL FOR BICYCLE TIRES.
No. 597,563. Patented Jan. 18, 1898.
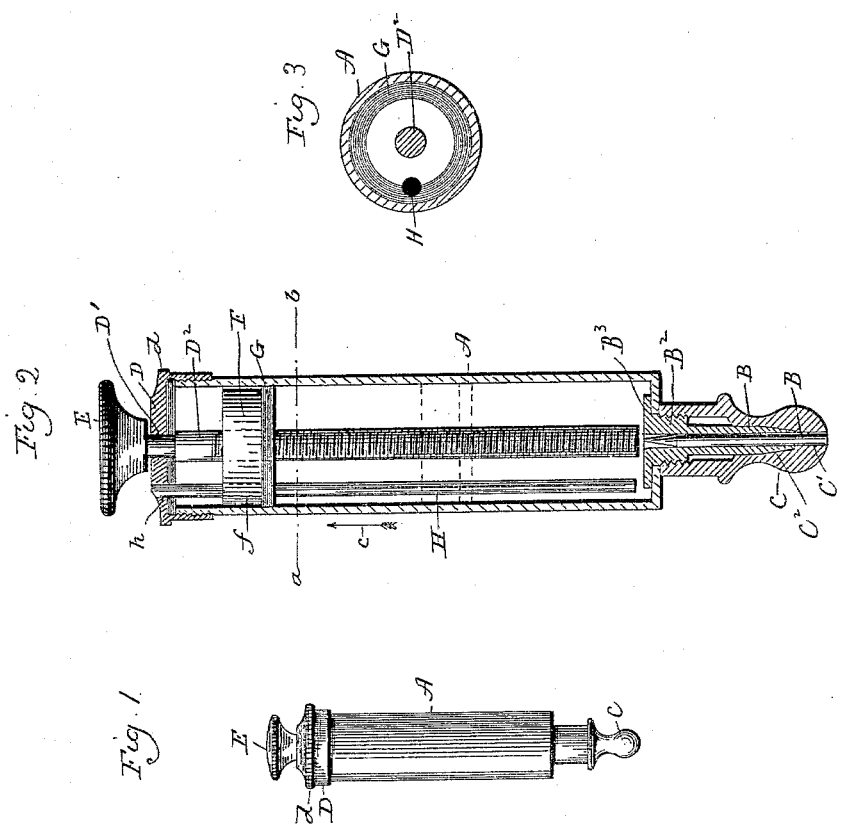

UNITED STATES PATENT OFFICE.

WALTER H. PERKINS, OF WATERBURY, CONNECTICUT, ASSIGNOR TO THE WATERBURY MANUFACTURING COMPANY, OF SAME PLACE.

REPAIR-TOOL FOR BICYCLE-TIRES.

SPECIFICATION forming part of Letters Patent No. 597,563, dated January 18, 1898.

Application filed September 20, 1897. Serial No. 652,240. (No model.)

*To all whom it may concern:*

Be it known that I, WALTER H. PERKINS, of Waterbury, in the county of New Haven and State of Connecticut, have invented a new Improvement in Repair-Tools for Bicycle-Tires; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation of a repair-tool constructed in accordance with my invention; Fig. 2, an enlarged view thereof in longitudinal section; Fig. 3, a view in transverse section on the line $a\ b$ of Fig. 1 and looking in the direction of the arrow $c$.

My invention relates to an improvement in tools for repairing the pneumatic tires of bicycles, the object being to produce a simple, compact, and effective tool.

With these ends in view my invention consists in a repair-tool having certain details of construction, as will be hereinafter described, and pointed out in the claim.

In carrying out my invention I employ a cylinder A, in which a liquid cement is placed, the lower end of this cylinder being closed and provided with a small tube-like nozzle B, having its point tapered, as at B', to adapt it to be the more readily thrust into the puncture of a tire. At its base this nozzle is formed with a threaded shoulder $B^2$ for the attachment of a nozzle-cap C, containing an independently-formed pin C', by means of which the nozzle is plugged when the device is not in use and also prevented from being clogged up. As herein shown, the extreme inner end of the nozzle is inserted into the cylinder and upset to form the retaining-flange $B^3$, as shown in Fig. 2. I do not, however, limit myself to constructing the nozzle in any particular way nor to any particular adaptation of it for securing it in place. As herein shown, the bottom of the internal chamber of the said cap is tapered, as at $C^2$, to conform it to the tapered end of the nozzle, the two tapered surfaces forming a tight joint supplementing the action of the pin in preventing any of the fluid in the cylinder from leaking out.

The upper end of the cylinder is provided with external screw-threads for the application to it of a cap D, having a knurled edge $d$ and formed with a central bearing-opening D' for the reception of the outer end of the operating-screw $D^2$, which extends into the cylinder almost to the closed inner end thereof and which is provided at its outer end with a knurled operating-nut E. The said screw passes through and operates a nut-like piston F, provided with a packing G, of leather or any other suitable material. To prevent the piston from rotating, whereby it is caused to be moved toward one end or the other of the cylinder when the screw is rotated, I employ a rod H, practically corresponding in length to the length of the screw, passing through an opening $f$, formed in the piston, within the edge thereof, and rigidly mounted at its outer end in the cap D at the point $h$. It will be understood from this construction that the cap, the screw, the operating-nut, the piston, and the rod are applied to and removed from the cylinder as one piece after they have been assembled together.

In using the device the cylinder is filled with liquid, of whatever character that may be, while its nozzle is stopped by the pin C' of the nozzle-cap C. The screw, rod, and piston are then inserted into the open end of the cylinder and the cap D screwed home. Now when it is desired to repair a puncture the nozzle-cap is removed from the device and the tube thereof thrust into the puncture of the tire, after which the operating-nut is turned so as to cause the piston to move inward in the cylinder and by placing the liquid therein under compression force a portion of it out into the tire through the nozzle. In this way all of the liquid in the cylinder may be utilized, as the piston will expel every drop of it. Prior to refilling the tool with liquid the screw is reversed, so as to draw the piston back, so to speak, to a position at or near the cap, as shown in Fig. 2.

The function of the rod H, as will readily be seen, is to prevent the piston from rotating with the screw, by which it is therefore moved back and forth in the cylinder. Heretofore the means employed for this purpose have been permanently located within the cylinder and have been constructed so as to interfere somewhat with the free movement of the piston back and forth and have been open to the further objection that they have been liable to be gummed up by the liquid, which is of a gummy character and difficult to be cleaned off. On the other hand, the rod employed by me does not appreciably interfere with the free movement of the piston and may be perfectly cleaned by removing the cap, and hence the rod, from the cylinder, after which the rod may be wiped off with benzin. Furthermore, by employing a rod passing through an opening formed in the piston within the edge thereof the piston and its packing may be made to fit the cylinder so snugly that none of the liquid will be forced under compression past the piston and into the upper end of the cylinder. Again, in my improved construction there is nothing in the cylinder to prevent the insertion thereinto of the nut in any position, or, in other words, there is no necessity of alining the piston with any permanently-located device within the cylinder for preventing it from rotating.

It is apparent that in carrying out my invention some changes from the construction herein shown and described may be made, and I would therefore have it understood that I do not limit myself to the exact construction shown, but hold myself at liberty to make such changes and alterations as fairly fall within the spirit and scope of my invention.

I am aware, however, and as already stated, that repair-tools of the general character described herein are old, and that it is old to provide them with means for keeping their nut-like pistons from rotating. I do not therefore claim such means broadly, nor do I broadly claim the provision of a repair-tool with a nozzle-cap provided with a pin to enter the nozzle.

Having fully described my invention, what I claim as new, and desire to secure by Letters Patent, is—

In a tool for repairing punctures in the pneumatic tires of bicycles, the combination with a cylinder provided at its lower end with a nozzle, of a cap adapted to be applied to the upper end of the cylinder; a long screw entering the cylinder and mounted at its outer end in the said cap, a nut-like piston adapted to fit within the cylinder, and mounted upon the screw by means of which it is moved back and forth in the cylinder, and a rod mounted at its outer end in the cap, extending into the cylinder and passing through an opening formed within the edge of the piston which the rod holds against rotation, whereby a uniform fit between the piston and the cylinder is secured, and whereby also the rod is removed from the cylinder when the cap is disconnected therefrom, thus permitting the rod to be easily cleaned.

In testimony whereof I have signed this specification in the presence of two subscribing witnesses.

WALTER H. PERKINS.

Witnesses:
JOHN S. NEAGLE,
JOHN W. BANZIZE.